(12) United States Patent
No

(10) Patent No.: US 11,915,249 B2
(45) Date of Patent: Feb. 27, 2024

(54) MOBILE TERMINAL AND METHOD FOR REGISTERING ELECTRONIC DEVICE BY MOBILE TERMINAL

(71) Applicant: LG Electronics Inc., Seoul (KR)

(72) Inventor: Hyohoun No, Seoul (KR)

(73) Assignee: LG Electronics Inc., Seoul (KR)

( * ) Notice: Subject to any disclaimer, the term of this patent is extended or adjusted under 35 U.S.C. 154(b) by 615 days.

(21) Appl. No.: 17/058,436

(22) PCT Filed: May 23, 2019

(86) PCT No.: PCT/KR2019/006227
§ 371 (c)(1),
(2) Date: Nov. 24, 2020

(87) PCT Pub. No.: WO2019/225998
PCT Pub. Date: Nov. 28, 2019

(65) Prior Publication Data
US 2021/0365956 A1    Nov. 25, 2021

(30) Foreign Application Priority Data

May 24, 2018  (KR) .................. 10-2018-0059063

(51) Int. Cl.
*G06Q 30/018* (2023.01)
*G06F 3/0484* (2022.01)
(Continued)

(52) U.S. Cl.
CPC ......... *G06Q 30/018* (2013.01); *G06F 3/0484* (2013.01); *G10L 25/51* (2013.01); *H04M 1/72415* (2021.01)

(58) Field of Classification Search
CPC ........... G06Q 30/018; H04M 1/724158; G06F 3/0484; G10L 25/51
(Continued)

(56) References Cited

U.S. PATENT DOCUMENTS

2014/0191855 A1    7/2014  Kim et al.
2015/0236908 A1*   8/2015  Kim ................... H04L 63/0846
                                                              709/221
(Continued)

FOREIGN PATENT DOCUMENTS

JP    2005109746    4/2005
JP    2014175794    9/2014
(Continued)

OTHER PUBLICATIONS

Extended European Search Report in European Appln. No. 19808308.1, dated Jan. 21, 2022, 7 pages.
(Continued)

*Primary Examiner* — Maria El-Zoobi
(74) *Attorney, Agent, or Firm* — Fish & Richardson P.C.

(57) ABSTRACT

A method for registering an electronic device to be controlled by a mobile terminal, includes: receiving a request to register an electronic device, providing, on a mobile terminal display, an operation interface that enables a user to provide user input that causes the electronic device to output an identification sound, receiving, from the electronic device, the identification sound output from the electronic device based on the user input, verifying product information of the electronic device corresponding to the identification sound, providing, on the mobile terminal display, a registration interface corresponding to the product information of the electronic device, the registration interface providing registration information related to how to register the electronic device to be controlled by the mobile terminal, and performing, by the mobile terminal, a registration process set forth by the registration information to register the electronic device to enable the mobile terminal to control the electronic device.

17 Claims, 17 Drawing Sheets

(51) Int. Cl.
*G10L 25/51* (2013.01)
*H04M 1/72415* (2021.01)

(58) Field of Classification Search
USPC .................................................. 379/102.01
See application file for complete search history.

(56) References Cited

U.S. PATENT DOCUMENTS

2016/0226676 A1   8/2016   Shin et al.
2017/0078110 A1   3/2017   Han et al.
2018/0132286 A1   5/2018   Shim

FOREIGN PATENT DOCUMENTS

| JP | 2014175794 | A | * | 1/2016 | ............... H04N 5/00 |
| JP | 2014175794 | A | * | 7/2016 | ............... H04Q 9/00 |
| KR | 20120019583 | | | 3/2012 | |
| KR | 20160068703 | | | 6/2016 | |
| KR | 20160139141 | | | 12/2016 | |
| KR | 20180016022 | | | 2/2018 | |
| KR | 20180035292 | | | 4/2018 | |

OTHER PUBLICATIONS

Office Action in European Appln. No. 19808308.1, dated May 19, 2023, 5 pages.

* cited by examiner

← Selecting Product

Select product to be registered

Washing machine

- Top-loading washing machine
- Front-loading washing machine
- Clothes dryer
- Styler steam closet
- Mini washing machine Kitchen appliance

- Refrigerator
- Kimchi refrigerator
- Lightwave oven
- Microwave oven

FIG. 8

| Identification pattern | Model name |
|---|---|
| OX1001 | S831TS35 |
| OX1002 | S829TS35 |
| OX1003 | S831SN35 |
| OX1004 | S631S32 |
| . . . . . | . . . . . |

FIG. 11

| Model name | Registration method |
|---|---|
| S831TS35 | R1 |
| S829TS35 | R2 |
| S831SN35 | R1 |
| S631S32 | R3 |
| ⋮ | ⋮ |

FIG. 12

MOBILE TERMINAL AND METHOD FOR REGISTERING ELECTRONIC DEVICE BY MOBILE TERMINAL

CROSS-REFERENCE TO RELATED APPLICATIONS

This application is a National Stage application under 35 U.S.C. § 371 of International Application No. PCT/KR2019/006227, filed on May 23, 2019, which claims the benefit of Korean Patent Application No. 10-2018-0059063, filed on May 24, 2018. The disclosures of the prior applications are incorporated by reference in their entirety.

TECHNICAL FIELD

Disclosed herein are a mobile terminal capable of connecting to and controlling an electronic device through a network, and a method for processing registration of the electronic device through the mobile terminal.

BACKGROUND ART

Internet of Things (IoT) technology denotes intelligence technologies and services that connect all things based on the Internet, i.e., a network and enable mutual communication based on human-to-thing information and thing-to-thing information.

The IoT technology is further advanced than the wired communication-based Internet or mobile Internet. Electronic devices, to which the IoT technology is applied, can be connected through a network and perform their own function based on remote control by a user. The IoT technology seems to be similar to M2M (Machine to Machine) communication. However, M2M is mainly intended for communication between communication equipment and a user. The IoT technology allows an electronic device, connected through a network, to interact with all the information in the real world and virtual world as well as things.

In recent years, the IoT technology has served as a platform for smart home appliances. The IoT technology enables various types of electronic devices, such as a refrigerator, a washing machine, an air conditioner and the like at homes, to be connect through a network and allows a user to remotely control each of the electronic devices or detect an operation state of each electronic device in real time.

To control electronic devices at homes using the IoT technology, the electronic devices to be controlled need to be registered on a network through a terminal for control, e.g., a mobile terminal such as a smartphone. A related art in relation to the IoT technology is disclosed in Korean Patent Publication No. 10-2018-0016022.

FIG. 1 shows a configuration of a network between electronic devices and a mobile terminal, to which the IoT technology is applied according to the related art. FIG. 2 is a flow chart showing a process of registering an electronic device through a mobile terminal according to the related art.

As illustrated in FIG. 1, a user can remotely control electronic devices such as an air conditioner 102, a washing machine 104, an air purifier 106 and a refrigerator 108 or can detect operation states of the electronic devices in real time using a mobile terminal 10 such as a smartphone. The mobile terminal 10 and each of the electronic devices 102 to 108 can exchange data based on wired or wireless communication. Additionally, the electronic devices 102 to 108 can exchange data with each other based on wired or wireless communication.

For the mobile terminal 10 and each of the electronic devices 102 to 108 or for the electronic devices 102 to 108 to exchange data with each other, each of the electronic devices 102 to 108 need to be registered on the same network through the mobile terminal 10. FIG. 2 shows a process in which the user registers each of the electronic devices 102 to 108 using an application for control of a smart home appliance, installed on the mobile terminal 10.

Referring to FIGS. 1 and 2, the user performs a login for using a smart home appliance control service, using an application executed on the mobile terminal 10 (202). After the login (202), the user presses a registration button on a screen of the mobile terminal 10 to request registration of an electronic device (204).

When the user requests the registration of the electronic device, a list of registrable electronic devices provided through the application is displayed on the screen of the mobile terminal 10. The user selects an electronic device to be registered, i.e., an electronic device to be registered, from the list of electronic devices (206). For example, the user can select an air conditioner 102 from electronic devices 102 to 108 around the user as the electronic device to be registered.

Although the user selects a specific electronic device as the electronic device to be registered among the electronic devices 102 to 108 as described above, a registration method appropriate for the electronic device to be registered selected needs to be specified to register the electronic device. For example, air conditioners 102 were launched at different times or the registration methods thereof were set differently.

To specify the method for registering the electronic device to be registered selected by the user, an application for control of a smart home appliance, installed on the mobile terminal 10 of the related art, requests the user to detect features of the electronic device to be registered in a predetermined order. A method for detecting the features of the electronic device to be registered is described as follows.

When the user selects the electronic device to be registered (206), a predetermined first logo and a message for requesting detection as to whether the first logo is presented on the electronic device to be registered selected by the user are displayed on the screen of the mobile terminal 10. Accordingly, the user detects whether the first logo presented on the screen of the mobile terminal 10 is displayed on the electronic device to be registered, e.g., the air conditioner 102 (208).

When the first logo is presented on the electronic device to be registered (210) as a result of detection (208), the user presses a "Yes" button displayed on the screen of the mobile terminal 10. Then an image and a message in relation to a first registration method applied to an electronic device having the first logo are displayed on the screen of the mobile terminal 10, and the user carries out the first registration method with reference to the screen of the mobile terminal 10 (212). As the first registration method is carried out, the electronic device to be registered (the air conditioner 102) is registered.

When the first logo is not presented on the electronic device to be registered (210) as a result of detection (208), the user presses a "No" button displayed on the screen of the mobile terminal 10. Then a predetermined second logo and a message for requesting detection as to whether the second logo is displayed on the electronic device to be registered selected by the user are displayed on the screen of the mobile terminal 10. Accordingly, the user detects whether the second logo displayed on the screen of the mobile terminal 10 is displayed on the electronic device to be registered, e.g., the air conditioner 102 (214).

When the second logo is not presented on the electronic device to be registered (216) as a result of detection (214), the user presses the "No" button displayed on the screen of the mobile terminal 10. Then an image and a message in relation to a second registration method applied to an electronic device, on which none of the first logo and the second logo is presented, are displayed on the screen of the mobile terminal 10, and the user carries out the second registration method with reference to the screen of the mobile terminal 10 (218). As the second registration method is carried out, the electronic device to be registered (the air conditioner 102) is registered.

When the second logo is presented on the electronic device to be registered (216) as a result of detection (214), the user presses the "Yes" button displayed on the screen of the mobile terminal 10. Then a message for requesting detection as to whether the electronic device to be registered selected by the user is provided with a specific component, e.g., a touch screen, is displayed on the screen of the mobile terminal 10. Accordingly, the user detects whether the electronic device to be registered, e.g., the air conditioner 102, is provided with the touch screen (220).

When the electronic device to be registered is provided with the touch screen (222) as a result of detection (220), the user presses the "Yes" button displayed on the screen of the mobile terminal 10. Then an image and a message in relation to a third registration method applied to an electronic device having the second logo and provided with a touch screen are displayed on the screen of the mobile terminal 10, and the user carries out the third registration method with reference to the screen of the mobile terminal 10 (224). As the third registration method is carried out, the electronic device to be registered (the air conditioner 102) is registered.

When the electronic device to be registered is not provided with the touch screen (222) as a result of detection (220), the user presses the "No" button displayed on the screen of the mobile terminal 10. Then an image and a message in relation to a fourth registration method applied to an electronic device having the second logo and provided with no touch screen are displayed on the screen of the mobile terminal 10, and the user carries out the fourth registration method with reference to the screen of the mobile terminal 10 (226). As the fourth registration method is carried out, the electronic device to be registered (the air conditioner 102) is registered.

In the related art, to specify a method for registering an electronic device, a user has to detect features of the electronic device such as a specific logo or a specific component of the electronic device with the eye, resulting in a complex registration process and an increase in time taken for registration.

In the related art, a user can misunderstand an image or a message displayed on a mobile terminal while detecting features of an electronic device or can make input errors while inputting the features of the electronic device, causing failure in registration of the electronic device.

SUMMARY

Technical Problems

The present disclosure is directed to a method for registering an electronic device by a mobile terminal such that the method for registering an electronic device is specified without causing a user to detect features of an electronic device with the naked eye and to input the features, thereby making it possible to simplify a registration process of the electronic device and shorten time taken for the registration process.

The present disclosure is directed to a method for registering an electronic device by a mobile terminal, which may exclude the possibility that a user is not aware of features of an electronic device correctly or makes input errors while inputting the features, thereby making it possible to prevent failure in registration of the electronic device.

Aspects of the present disclosure are not limited to the above-described ones. Additionally, other aspects and advantages that have not been mentioned may be clearly understood from the following description and may be more clearly understood from embodiments. Further, it will be understood that the aspects and advantages of the present disclosure may be realized via means and combinations thereof that are described in the appended claims.

Technical Solutions

A method for registering an electronic device by a mobile terminal according to one embodiment may include receiving a request for registration of an electronic device to be registered from a user, providing an operation method for outputting an identification sound for identifying the electronic device to be registered to the user such that the identification sound of the electronic device to be registered is output, receiving the identification sound output from the electronic device to be registered as a result of an operation of the user, verifying product information of the electronic device to be registered corresponding to the identification sound, providing a registration method corresponding to the product information of the electronic device to be registered to the user, and processing registration of the electronic device to be registered according to the registration method.

In one embodiment, verifying product information of the electronic device to be registered corresponding to the identification sound may include converting the identification sound into an identification pattern, and searching a pre-stored classification table for product information corresponding to the identification pattern and determining the product information searched as product information of the electronic device to be registered.

The method may further include searching a pre-stored registration method table for a registration method corresponding to an identifier of the electronic device to be registered.

In one embodiment, processing registration of the electronic device to be registered according to the registration method may include receiving registration information from the electronic device to be registered, and registering the electronic device to be registered as a device to be controlled with reference to the registration information.

The method may further include determining failure in registration of the electronic device to be registered when product information of the electronic device to be registered is not verified.

The method may further include determining failure in registration of the electronic device to be registered when there is no registration method corresponding to product information of the electronic device to be registered.

The method may further include receiving failure information from a device to be controlled after the electronic device to be registered is registered as the device to be controlled, and transmitting product information and failure information of the device to be controlled to a mobile terminal of a customer service provider through a registration server.

A mobile terminal according to one embodiment may include a display configured to display an image or a text, a controller configured to provide an operation method for outputting an identification sound for identifying an electronic device to be registered through the display such that the identification sound of the electronic device to be registered is output, when receiving a request for registration of the electronic device to be registered from a user, an identification sound receiver configured to receive an identification sound output from the electronic device to be registered as a result of operation of the user, wherein the controller verifies product information of the electronic device to be registered corresponding to the identification sound, provides a registration method corresponding to the product information of the electronic device to be registered through the display, and processes registration of the electronic device to be registered according to the registration method.

In one embodiment, the controller may convert the identification sound into an identification pattern, and determine product information, which corresponds to the identification pattern and is searched in a pre-stored classification table, as product information of the electronic device to be registered.

In one embodiment, the controller may search a pre-stored registration method table for a registration method corresponding to an identifier of the electronic device to be registered.

In one embodiment, the controller may register the electronic device to be registered as a device to be controlled with reference to registration information received from the electronic device to be registered.

In one embodiment, the controller may determine failure in registration of the electronic device to be registered when product information of the electronic device to be registered is not verified.

In one embodiment, the controller may determine failure in registration of the electronic device to be registered when there is no registration method corresponding to product information of the electronic device to be registered.

In one embodiment, the controller may transmit failure information received from a device to be controlled and product information of the device to be controlled to a mobile terminal of a customer service provider through a registration server after the electronic device to be registered is registered as the device to be controlled.

Advantageous Effects

According to the present disclosure, a method for registering an electronic device may be specified without causing a user to detect features of an electronic device with the naked eye and to input the features, thereby making it possible to simplify a registration process of the electronic device and shorten time taken for the registration process.

According to the present disclosure, the possibility that a user is not aware of features of an electronic device rightly or makes input errors while inputting the features may be excluded, thereby making it possible to prevent failure in registration of the electronic device.

BRIEF DESCRIPTION OF DRAWINGS

FIGS. 6 to 10 show an image and a message displayed on a display of a mobile terminal during a process of selecting and searching a product, for registration of an electronic device.

FIG. 11 shows a classification table used as a reference during a process in which a mobile terminal processes registration of an electronic device according to one embodiment.

FIG. 12 shows a registration method table used as a reference during a process in which a mobile terminal processes registration of an electronic device according to one embodiment.

BEST MODE

Figure 1:
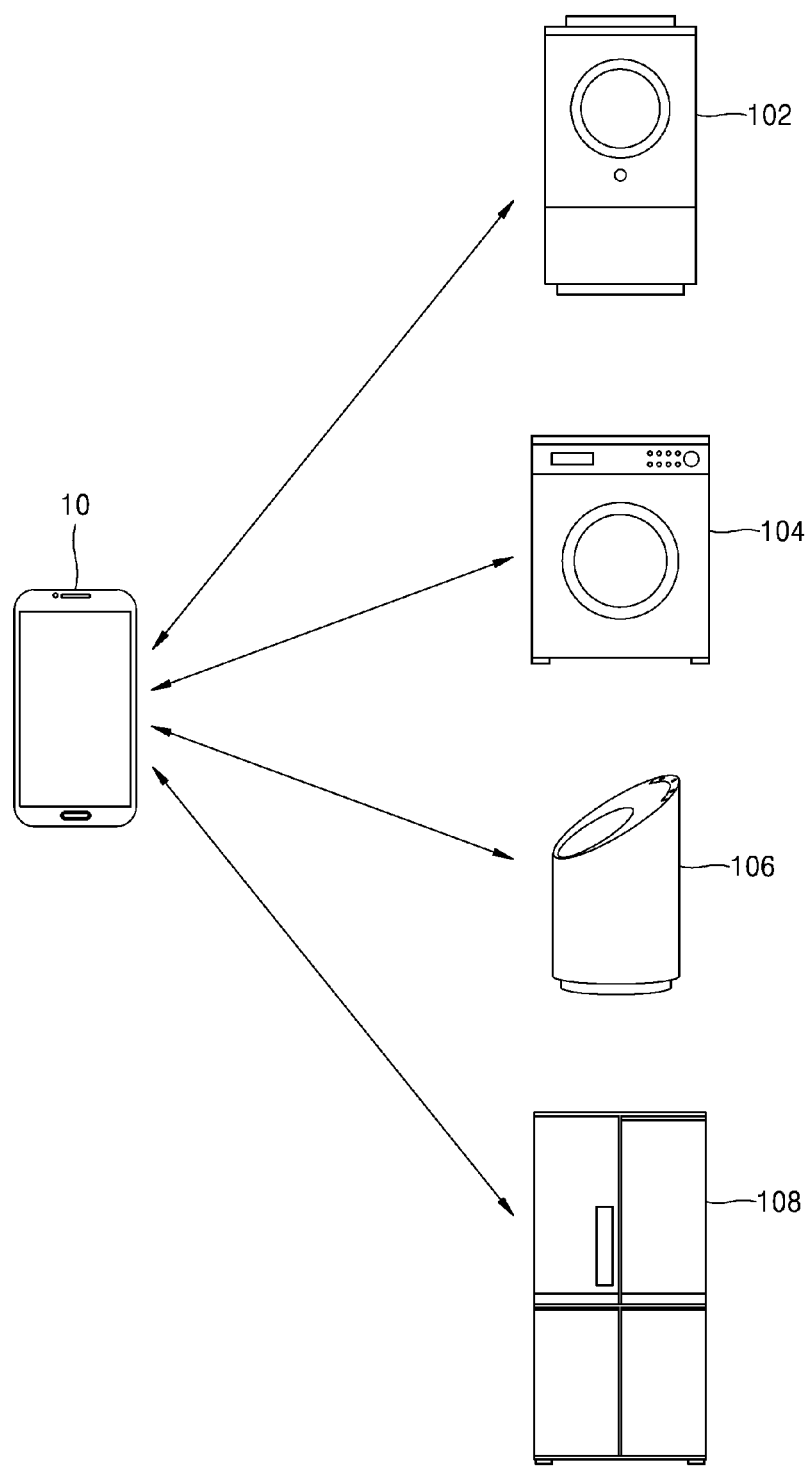
FIG. 1 shows a configuration of a network between electronic devices and a mobile terminal, to which the IoT technology is applied according to the related art.
Figure 2:
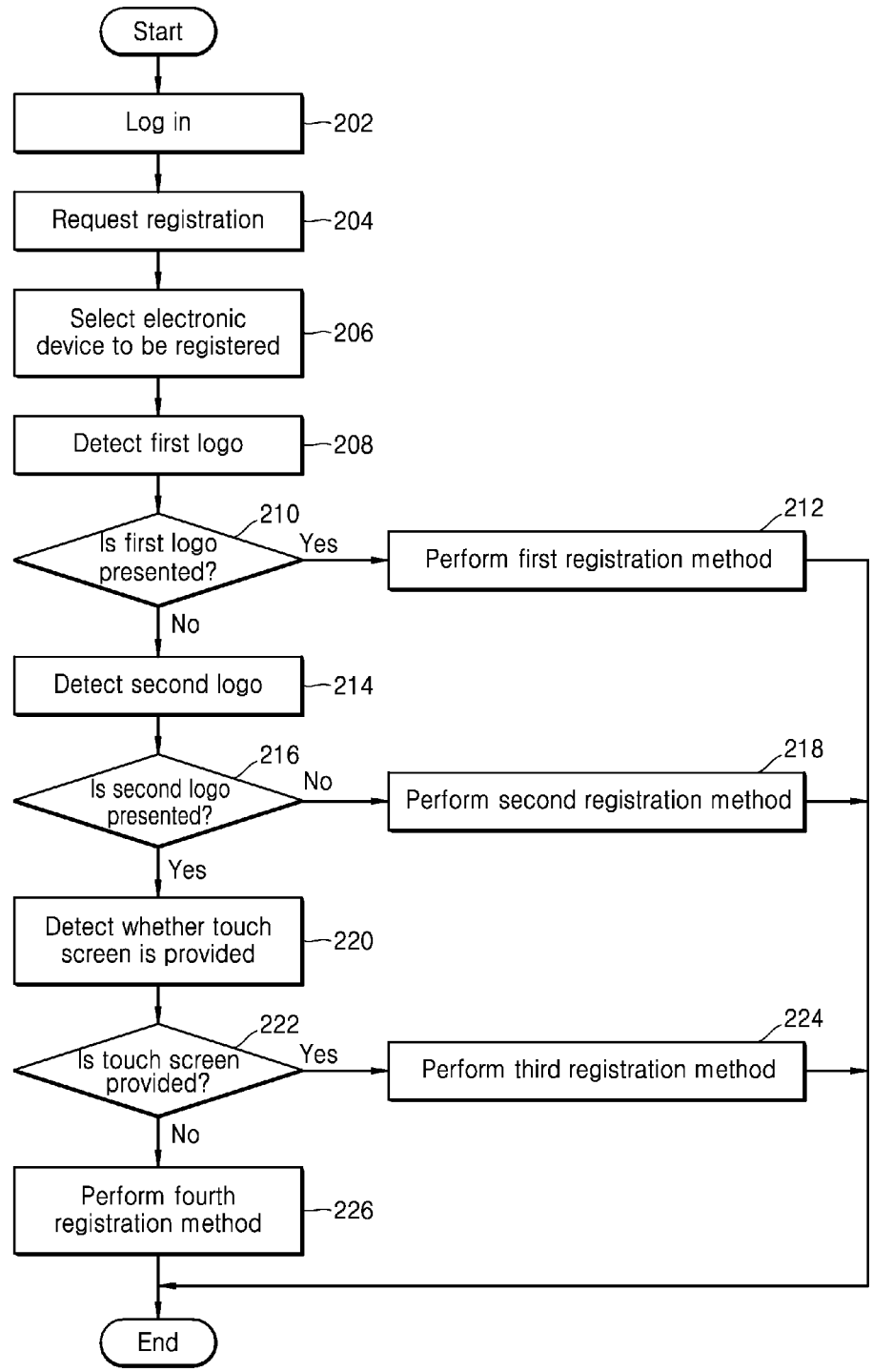
FIG. 2 is a flow chart showing a process of registering an electronic device through a mobile terminal according to the related art.

The above-described aspects, features and advantages are specifically described with reference to the accompanying drawings hereunder such that one having ordinary skill in the art to which the present disclosure pertains may easily implement the technical spirit of the disclosure. In description of the disclosure, detailed description of known technologies in relation to the disclosure is omitted if it is deemed to make the gist of the disclosure unnecessarily vague. Below, preferred embodiments according to the disclosure are specifically described. Throughout the specification, identical reference numerals may denote identical or similar components.

Figure 3:
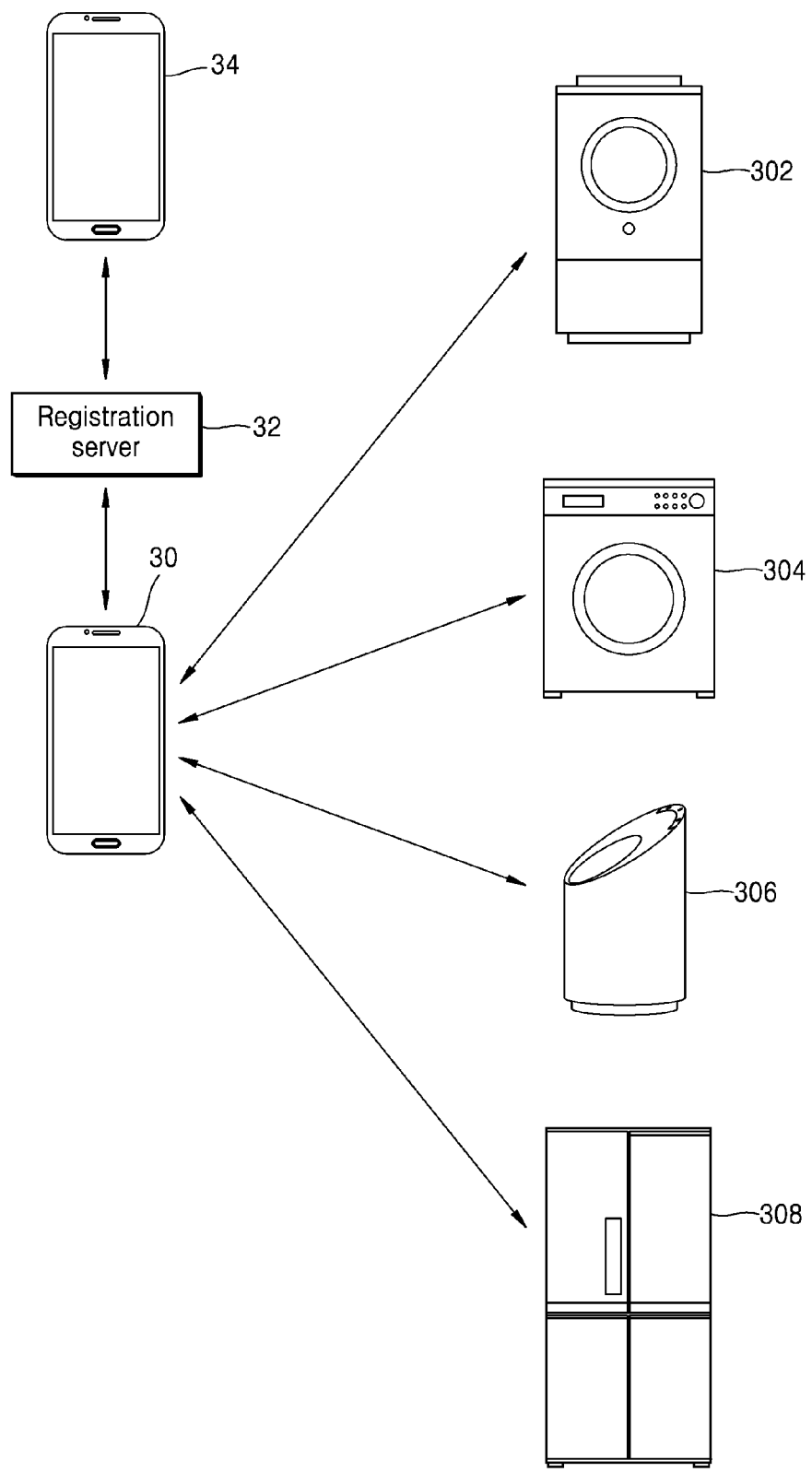
FIG. 3 shows a configuration of a network between electronic devices and a mobile terminal to which IoT technology is applied according to the present disclosure.

FIG. 3 shows a configuration of a network between electronic devices and a mobile terminal to which IoT technology is applied according to the present disclosure.

As illustrated in FIG. 3, a user may remotely control electronic devices such as an air conditioner 302, a washing machine 304, an air purifier 306 and a refrigerator 308 or may detect operation states of the electronic devices in real time, using a mobile terminal 30 such as a smartphone. Below, a series of methods for controlling registered electronic devices and for detecting operation states thereof are referred to as control of a smart home appliance.

The user may perform registration of an electronic device and control of a smart home appliance, described below, through an application for control of a smart home appliance installed on the mobile terminal 30. Below, provided is an example in which a user selects a refrigerator 308 as an electronic device to be registered among various types of electronic devices and performs registration of the refrigerator 308. However, a registration method according to the present disclosure may be applied to other types of electronic devices.

The mobile terminal 30 and each of the electronic devices 302 to 308 may exchange data with each other based on wired communication or wireless communication. Additionally, the electronic devices 302 to 308 may exchange data mutually based on wired communication or wireless communication.

To remotely control the electronic device to be registered, e.g., the refrigerator 308 and to detect an operation state of the refrigerator 308 in real time, the user may perform registration of the refrigerator 308 through the mobile terminal 30.

During the process of registration of the electronic device to be registered, the mobile terminal 30 may exchange data with a registration server 32 based on communication with the registration server 32. In one embodiment, the registration sever 32 may store a classification table. Identification patterns, generated as a result of conversion of identification sounds output by electronic device to be registered, and product information (e.g., a model name) corresponding to each of the identification patterns may be listed in the classification table. The registration server 32 may search product information corresponding to an identification pattern transmitted by the mobile terminal 30 and may deliver the product information to the mobile terminal 30 at the request of the mobile terminal 30.

In one embodiment, the registration server 32 may store a registration method table. Product information (e.g., a model name) of electronic devices, and a registration method of an electronic device corresponding to each piece of product information are listed in the registration method table. The registration server 32 may search a registration method corresponding to a model name of an electronic device to be registered and may deliver the registration method to the mobile terminal 30 at the request of the mobile terminal 30.

In one embodiment, the registration server 32 may store product information of an electronic device to be registered, verified by the mobile terminal 30 based on an identification sound output by the electronic device to be registered. As the registration server 32 stores product information of an electronic device to be registered, the user may easily bring the product information of the electronic device to be registered to the mobile terminal 30 from the registration server 32 although the user exchanges the mobile terminal 30 or reinstalls an application for control of a smart home appliance according to the present disclosure.

Further, in one embodiment, the registration server 32 may communicate with a mobile terminal 34 of a customer service provider to exchange data. After registering an electronic device to be registered through the mobile terminal 30, the user may request detection of a failure of the registered electronic device through the mobile terminal 30. The electronic device subject to the request for detection of a failure may detect its failure on its own, and may generate failure information on details of the failure and deliver the failure information to the mobile terminal 30.

After checking the failure information, the user may request a customer service through the application for control of a smart home appliance of the mobile terminal 30. When the user requests the customer service, the mobile terminal 30 may transmit, to the registration server 32, the failure information of the failing electronic device and the product information detected during the registration process. After receiving the failure information and product information, the registration server 32 may transmit the failure information and product information to the mobile terminal 34 of the customer service provider at a short distance from the user, and may request a customer service for the failing electronic device.

Figure 4:
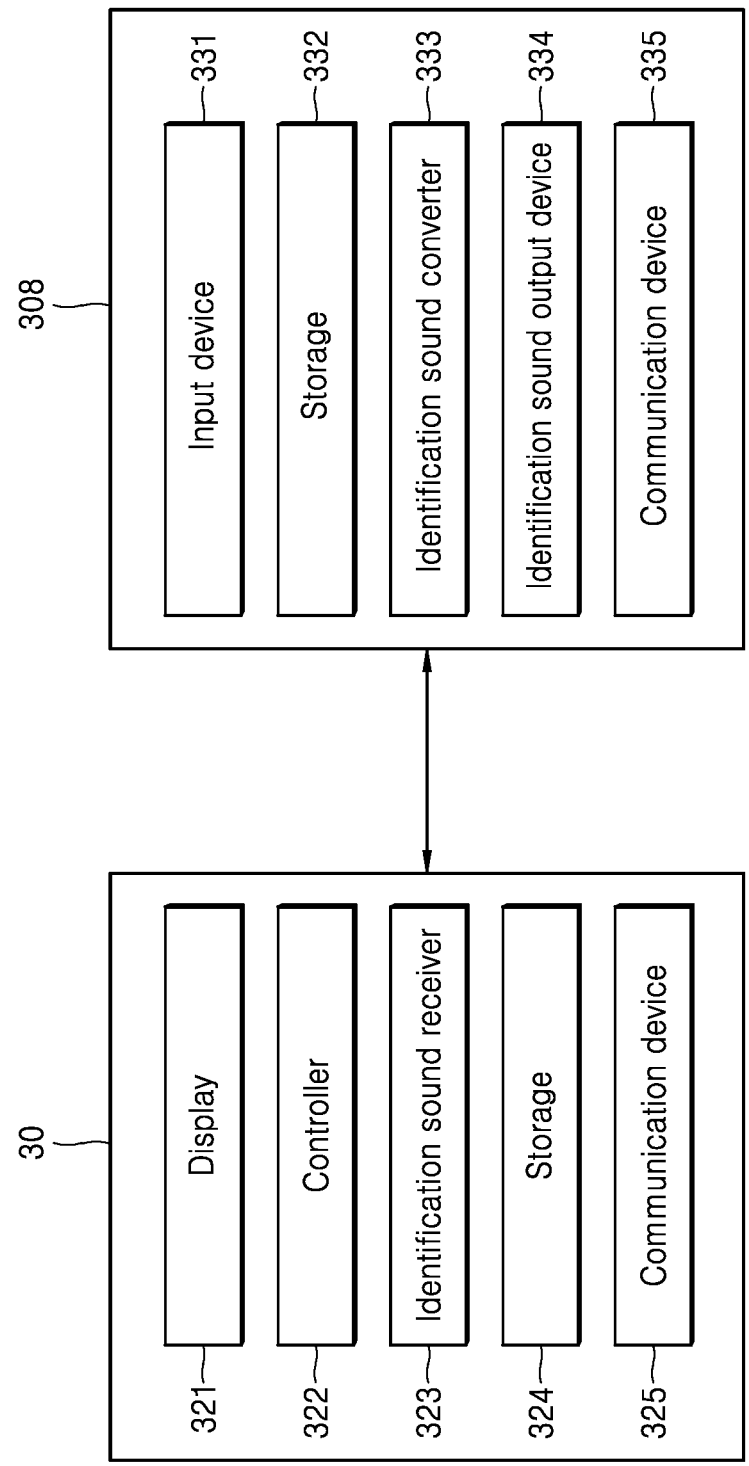
FIG. 4 is a block diagram schematically showing a configuration in a mobile terminal and an electronic device according to one embodiment.

FIG. 4 is a block diagram schematically showing a configuration in a mobile terminal and an electronic device according to one embodiment.

Referring to FIG. 4, the mobile terminal 30 may include a display 321, a controller 322, an identification sound receiver 323, a storage 324, and a Communication device 325.

The display 321 may display a process of registration of an electronic device and a process of control of an electronic device, performed through the application for control of a smart home appliance, and information needed during detection of an operation state or a failure of an electronic device, in the form of an image or a text. The display 321 may be implemented as one of the panels such as an LCD panel or an OLED panel, or may be implemented as a touch panel with a touch function.

The controller 322 may provide an operation method for outputting an identification sound for identifying an electronic device to be registered through the display 321 to output the identification sound of the electronic device to be registered when receiving a request for registration of the electronic device to be registered, e.g., the refrigerator 308 from the user.

When the user operates the electronic device to be registered with reference to the operation method displayed through the display 321, the electronic device to be registered may output the identification sound. The identification sound output by the electronic device to be registered may be input by the identification sound receiver 323. The identification sound receiver 323 may be implemented as a device such as a microphone that may receive a sound.

The controller 322 may convert the identification sound input through the identification sound receiver 323 and generate an identification pattern. The controller 322 may verify product information of the electronic device to be registered corresponding to the identification sound output by the electronic device to be registered based on the converted identification pattern.

After verifying the product information of the electronic device to be registered, the controller 322 may detect a registration method corresponding to the product information of the electronic device to be registered and provide the detected registration method to the user through the display 321. When the user carries out the registration method provided through the display 321, the controller 322 may process registration of the electronic device to be registered according to the registration method provided to the user.

The controller 322 may communicate with a Communication device 335 of the electronic device to be registered through the Communication device 325 during the process of registration of the electronic device to be registered and may receive registration information needed for registration from the electronic device to be registered. The registration information may include information such as a model name, a serial number, a production date and a production place of the electronic device to be registered.

Referring back to the drawing, an electronic device to be registered, e.g., a refrigerator 308, may include an input device 331, a storage 332, an identification sound converter 333, an identification sound output device 334 and a Communication device 335. FIG. 4 shows a refrigerator 308 as an example of the electronic device to be registered.

Depending on embodiments, other electronic devices may include the same components as the refrigerator 308 in FIG. 4.

The input device 331 is a device for the user to input information needed for control of the refrigerator 308. A physical button on a control panel of the refrigerator 308, or a touch panel constituting the control panel of the refrigerator 308 may be an example of the input device 331.

The storage 332 may store various types of information in relation to the refrigerator 308. Registration information (e.g., a model name, a serial number, a production date, a production place and the like), delivered through the Communication device 335 to the mobile terminal 30 during the process of registration of the refrigerator 308, may be stored in the storage 332.

The identification sound converter 333 may convert the product information (e.g., a model name or a serial number) of the refrigerator 308, stored in the storage 332, into an audio signal and may generate an identification sound. The identification sound converted by the identification sound converter 333 may be output by the identification sound output device 334. The identification sound output device 334 may be implemented as a device such as a speaker that may output an audio signal.

The Communication device 335 may exchange data with the Communication device 325 of the mobile terminal 30 based on communication. In one embodiment, the Communication device 335 may deliver the registration information stored in the storage 332 to the mobile terminal 30 through the Communication device 325 when the controller 322 processes registration of the electronic device to be registered according to a registration method applied to the refrigerator 308.

Figure 5:
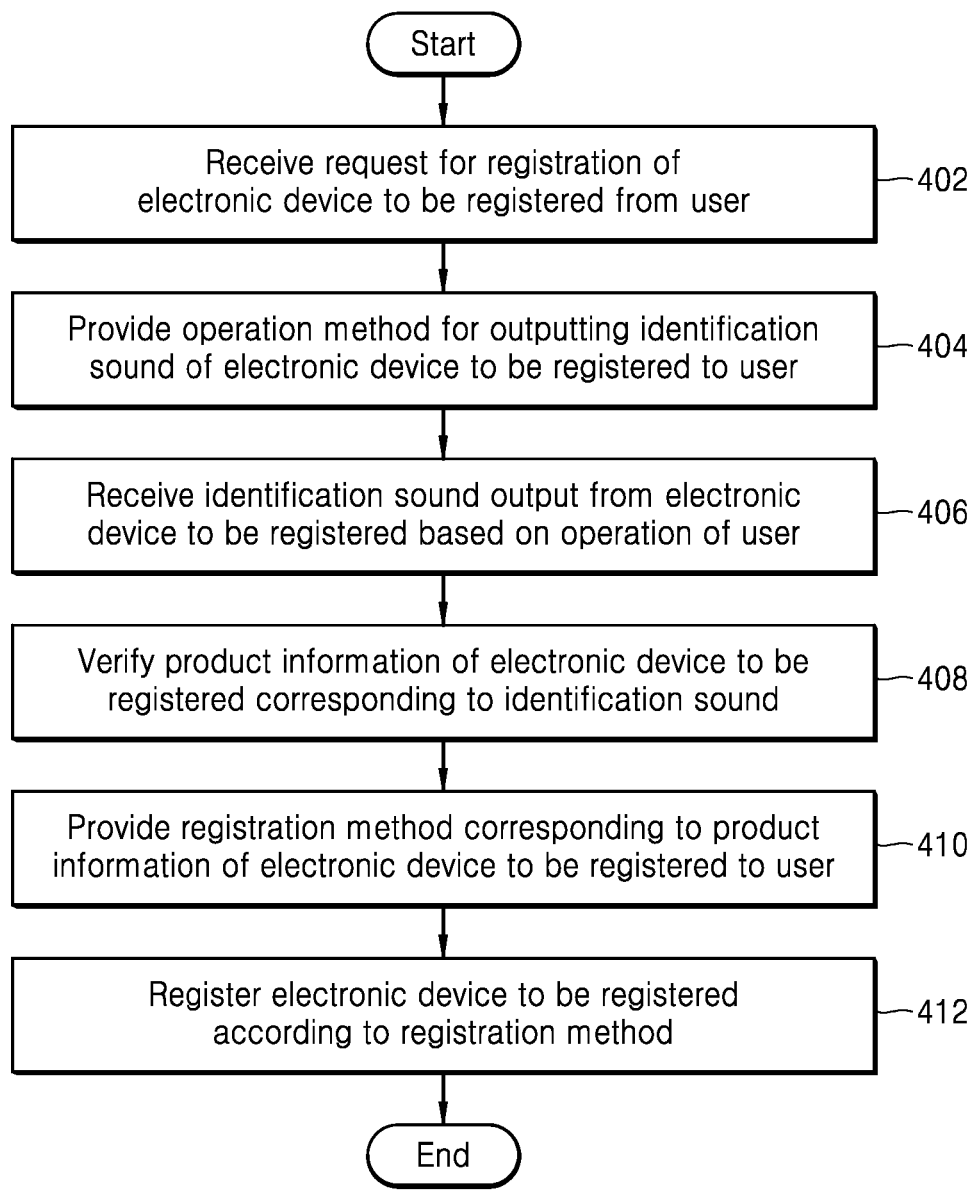
FIG. 5 is a flow chart showing a method for registering an electronic device by a mobile terminal according to one embodiment.

FIG. 5 is a flow chart showing a method for registering an electronic device by a mobile terminal according to one embodiment. FIGS. 6 to 10 show an image and a message displayed on a display of a mobile terminal during a process of selecting and searching a product, for registration of an electronic device. FIG. 11 shows a classification table used as a reference during a process in which a mobile terminal processes registration of an electronic device according to one embodiment. FIG. 12 shows a registration method table used as a reference during a process in which a mobile terminal processes registration of an electronic device according to one embodiment. FIGS. 13 to 16 show an image and a message displayed on a display of a mobile terminal during a process of processing registration according to a registration method of an electronic device to be registered.

Below, a method for registering an electronic device by a mobile terminal according to one embodiment is described with reference to FIGS. 6 to 16 along with FIG. 5.

Figure 6:
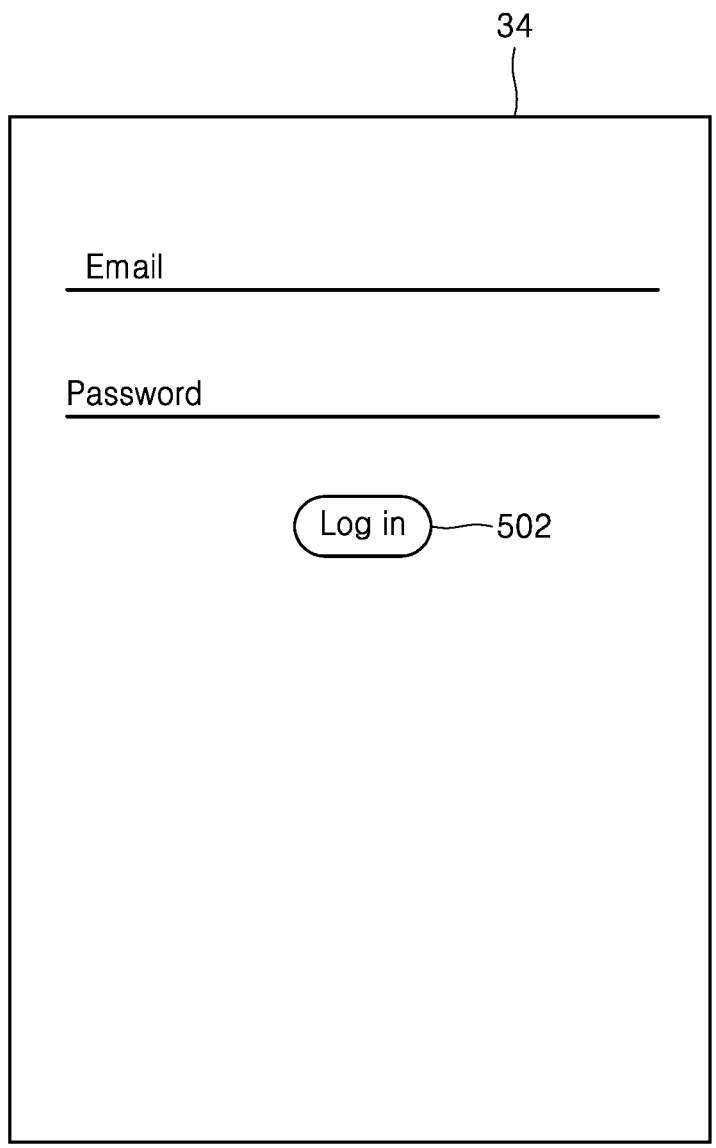

When the user executes an application for control of a smart home appliance installed on the mobile terminal 30, a login screen as in FIG. 6 may be displayed on the screen 34 displayed through the display 321 of the mobile terminal 30. The user may input a pre-registered email address or an ID and a password and press a login button 502 to log in.

Figure 7:
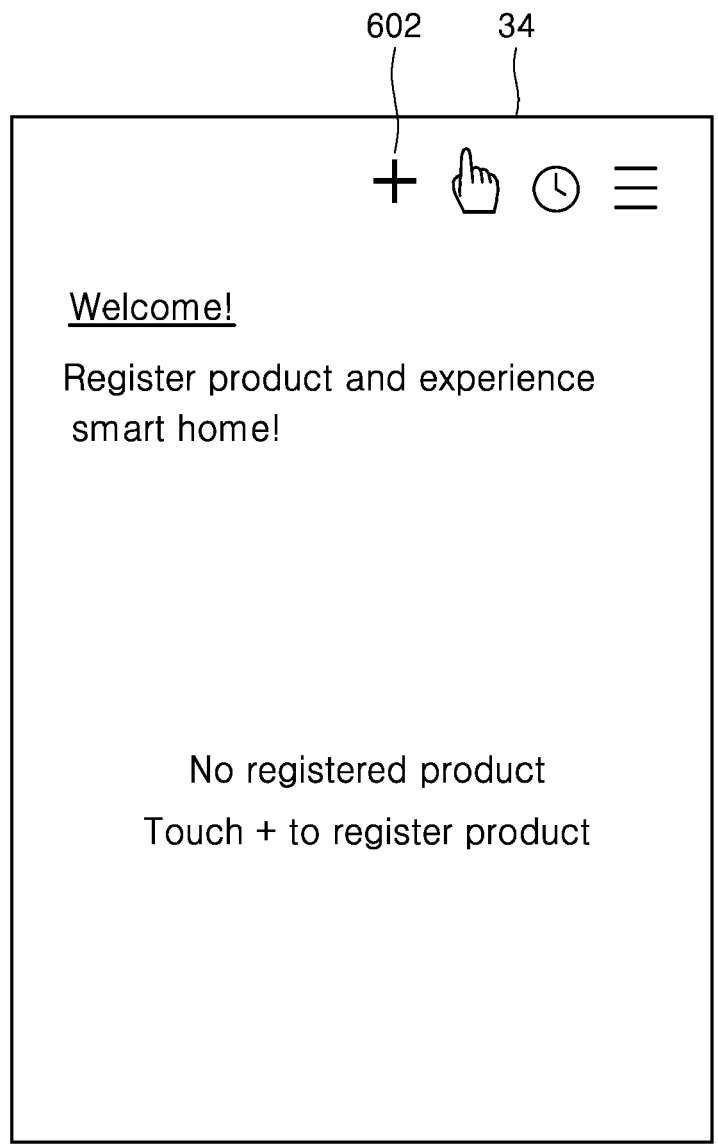

After the user logs in, an initial screen 34 as in FIG. 7 may be displayed through the display 321. The user may press a product addition button 602 based on a message on the screen 34 to request registration of an electronic device.

When the user presses the product addition button 602, a product selection screen 34 as in FIG. 8 may be displayed through the display 321. The user may select an electronic device to be registered, i.e., an electronic device to be registered, from a list of electronic devices provided through the product selection screen 34, and may request registration of the electronic device to be registered. Below, suppose that the user selects a "refrigerator" on the product selection screen 34 in FIG. 8.

As the user selects the "refrigerator" on the product selection screen 34 in FIG. 8, a controller 322 of the mobile terminal 30 may receive the request for registration of the electronic device to be registered (402). Then the controller 322 may provide an operation method for outputting an identification sound of the electronic device to be registered to the user (404).

Figure 9:
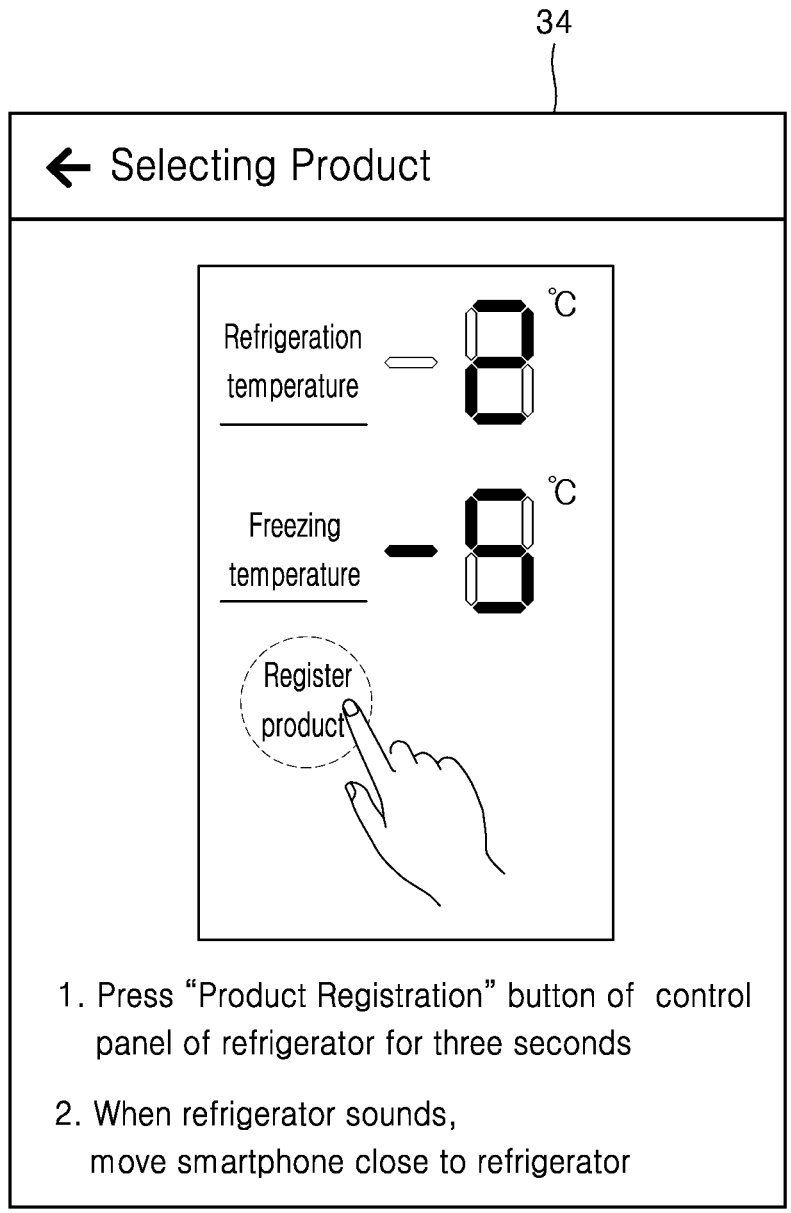

For example, when the user selects a "refrigerator" on the product selection screen 34 in FIG. 8, a screen 34 in relation to an operation method for allowing the refrigerator 308 selected by the user to output an identification sound may be displayed on a display 321 of the mobile terminal 30, as illustrated in FIG. 9. The user may press an input device 331, e.g., a "product registration" button, on a control panel of the refrigerator 308 for three seconds with reference to an image or a text displayed on the screen 34.

When the user presses the "product registration" button for three seconds, product information (e.g., a model name or a serial number) stored in a storage 332 may be converted into an identification sound by an identification sound converter 333. The converted identification sound may be output through an identification sound output device 334, e.g., a speaker.

When the refrigerator 308 outputs the identification sound, the user moves the mobile terminal 30 close to the refrigerator 308 based on details in a text on the screen 34 as in FIG. 9. Accordingly, the mobile terminal 30 may receive the identification sound output from the refrigerator 308 through an identification sound receiver 323, e.g., a microphone (406).

When the identification sound is input, the controller 322 may verify product information of the electronic device to be registered corresponding to the identification sound (408). To verify the product information of the electronic device to be registered, the controller 322 may convert the identification sound input through the identification sound receiver 323 into an identification pattern. For example, the controller 322 may convert the identification sound input through the identification sound receiver 323 into a digital data-type identification pattern such as "0X1003".

Figure 10:

While the controller 322 verifies the product information of the electronic device to be registered corresponding to the identification sound, a gage or a text indicating that verification of the product information is being performed may be displayed on the display 321 like the screen 34 in FIG. 10.

The controller 322 may verify the product information of the electronic device to be registered corresponding to the identification pattern previously converted with reference to a classification table pre-stored in the storage 324 of the mobile terminal 324. FIG. 11 shows an example of the classification table. The controller 322 may search the classification table, where the identification pattern and the product information (e.g., a model name) corresponding thereto are listed as illustrated in FIG. 11, for a model name (e.g., "S831SN35") corresponding to the identification pattern (e.g., "0X1003") previously converted, and may determine the searched model name as the product information of the electronic device to be registered.

The product information listed on the classification table may be defined as identification information such as a model name or a serial number of each product used to distinguish the types and registration methods of products.

In another embodiment, the classification table in FIG. 11 may be stored in a registration server 32. In this case, the controller 322 may transmit the identification pattern previously converted to the registration server 32 through a Communication device 325, and may request the registration server 32 to verify product information. The registration server 32, as described above, may search the classification table for a model name (e.g., "S831SN35") corresponding to the identification pattern (e.g., "0X1003") sent by the controller 322, and may transmit the model name searched to the mobile terminal 30.

The product information verified in the above process may be stored in the storage 324.

When the product information of the electronic device to be registered is not verified even after the above process finishes, the controller 322 may display a text or an image, indicating it is impossible to register the electronic device to be registered, through the display 321, and may determine that the registration is failed.

When the product information, i.e., the model name, of the refrigerator 308 subject to the user's request for registration is verified in the above process, the controller 322 may detect a registration method corresponding to the model name of the refrigerator 308 with reference to a registration method table in FIG. 12. The registration method table may be pre-stored in the storage 324 of the mobile terminal 30.

A registration method corresponding to each piece of product information is listed in the registration method table. According to the embodiment in FIG. 12, registration methods based on features of each product are classified by code names such as R1, R2 and R3. For example, code name R1 denotes a "registration method based on NFC tagging", and code name R3 denotes a "registration method based on Wi-Fi communication".

In yet another embodiment, the controller 322 may request the registration server 32 to detect a registration method corresponding to the product information previously verified. In this case, the registration server 32 may search the pre-stored registration method table for a registration method corresponding to the product information subject to the controller's request for detection, and may deliver the registration method to the controller 322.

When the method for registering the electronic device to be registered is not detected even after the above process finishes, the controller 322 may display a text or an image, indicating that it is impossible to register the electronic device to be registered, through the display 321 and may determine failure in the registration.

When the method for registering the electronic device to be registered, i.e., the refrigerator 308, is detected in the above process, the controller 322 may provide the registration method corresponding to the product information of the electronic device to be registered to the user (410).

Figure 13:
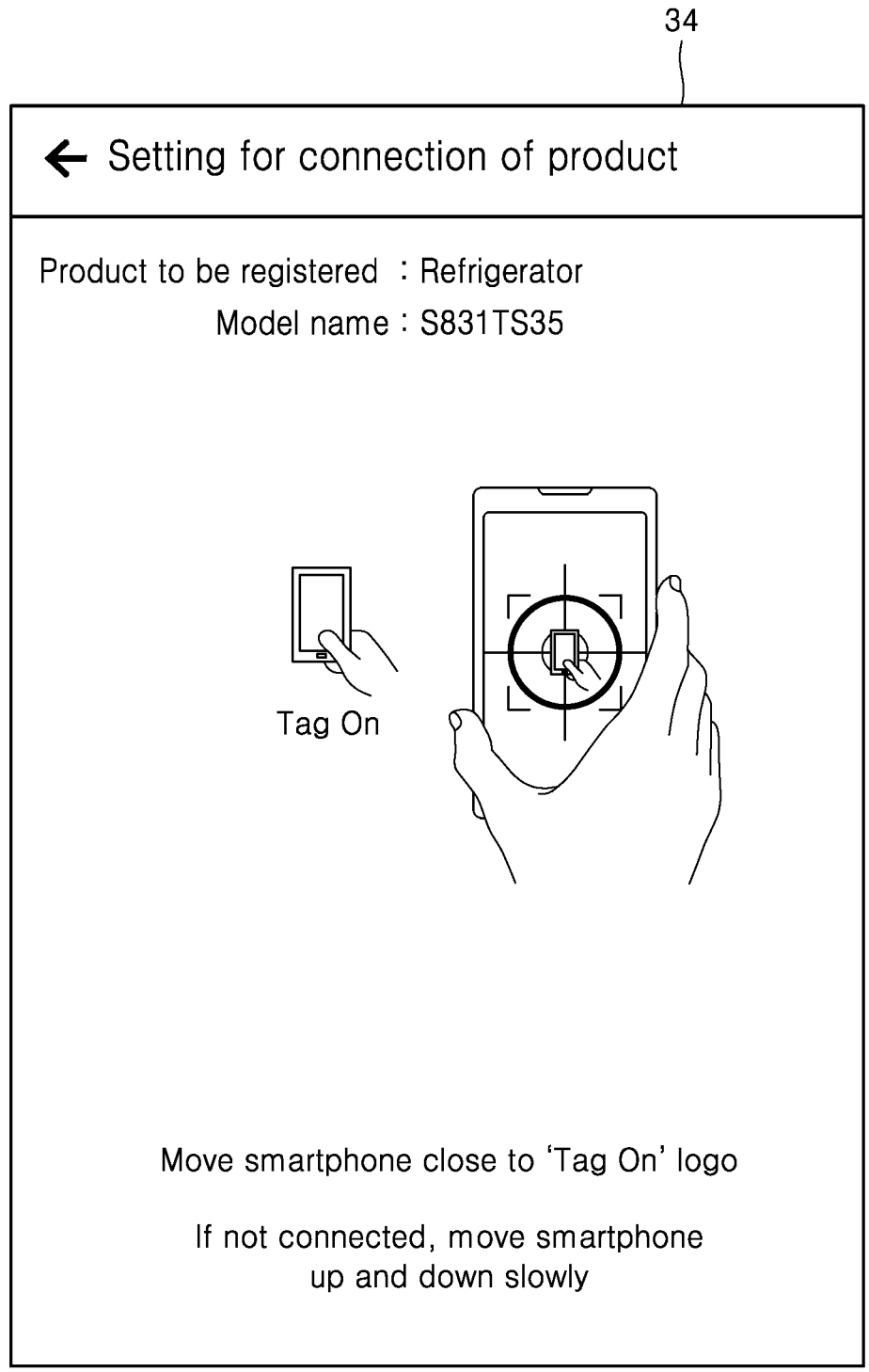
FIGS. 13 to 16 show an image and a message displayed on a display of a mobile terminal during a process of processing registration according to a registration method of an electronic device to be registered.
Figure 14:
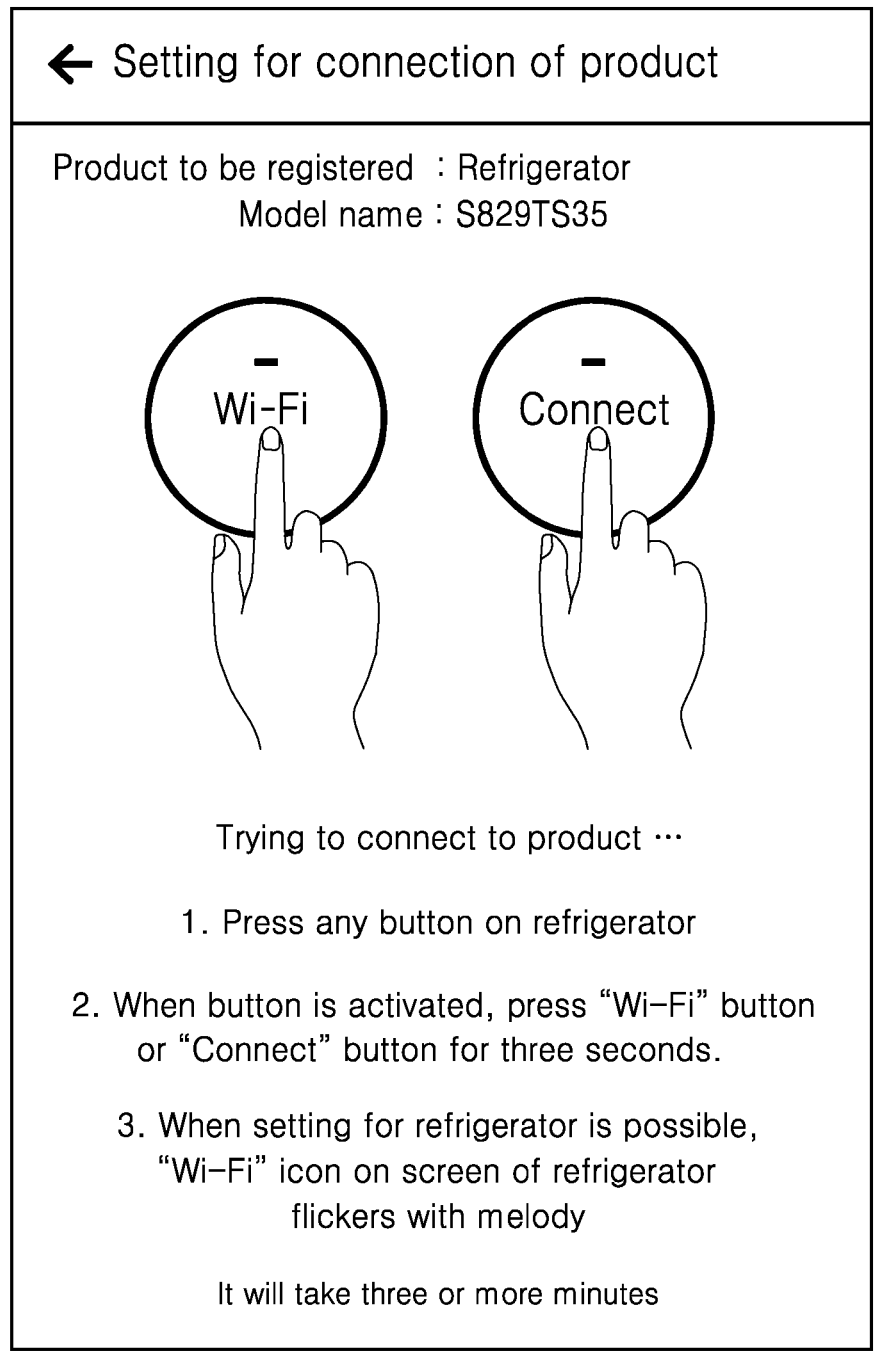

As an example, the controller 322 may display an operation guide screen 34 for the registration method (R1), i.e., the "registration method through NFC tagging" corresponding to the previously detected model name (S831SN35) of the refrigerator 308, through the display 321, to carry out the "registration method based on NFC tagging", as illustrated in FIG. 13. The user may bring the mobile terminal 30 in close contact with a "Tag On" logo presented on one side of the refrigerator 308 with reference to a method on the screen 34 in FIG. 13.

As another example, the controller 322 may display an operation guide screen for another registration method (R3). i.e., the "registration method based on Wi-Fi communication" corresponding to the model name (S829TS35) of the refrigerator 308. The user may press a specific button on the refrigerator 308 to activate a Wi-Fi function of the refrigerator 308 with reference to a method on the screen in FIG. 14. Accordingly, the refrigerator 308 and the mobile terminal 30 may communicate with each other.

Figure 15:

When the refrigerator 308 is ready for registration in the above process, the controller 322 may process the registration of the refrigerator 308 according to the previously specified method for registering the refrigerator 308 (412). While the registration of the refrigerator 308 is processed, a gage or a text, indicating the product is being registered, may be displayed on the display 321 as illustrated in FIG. 15.

To process the registration of the refrigerator 308, the controller 322 may receive registration information from the refrigerator 308, and, with reference to the received registration information, may register the refrigerator 308 as a device to be controlled to complete the registration process.

Figure 16:
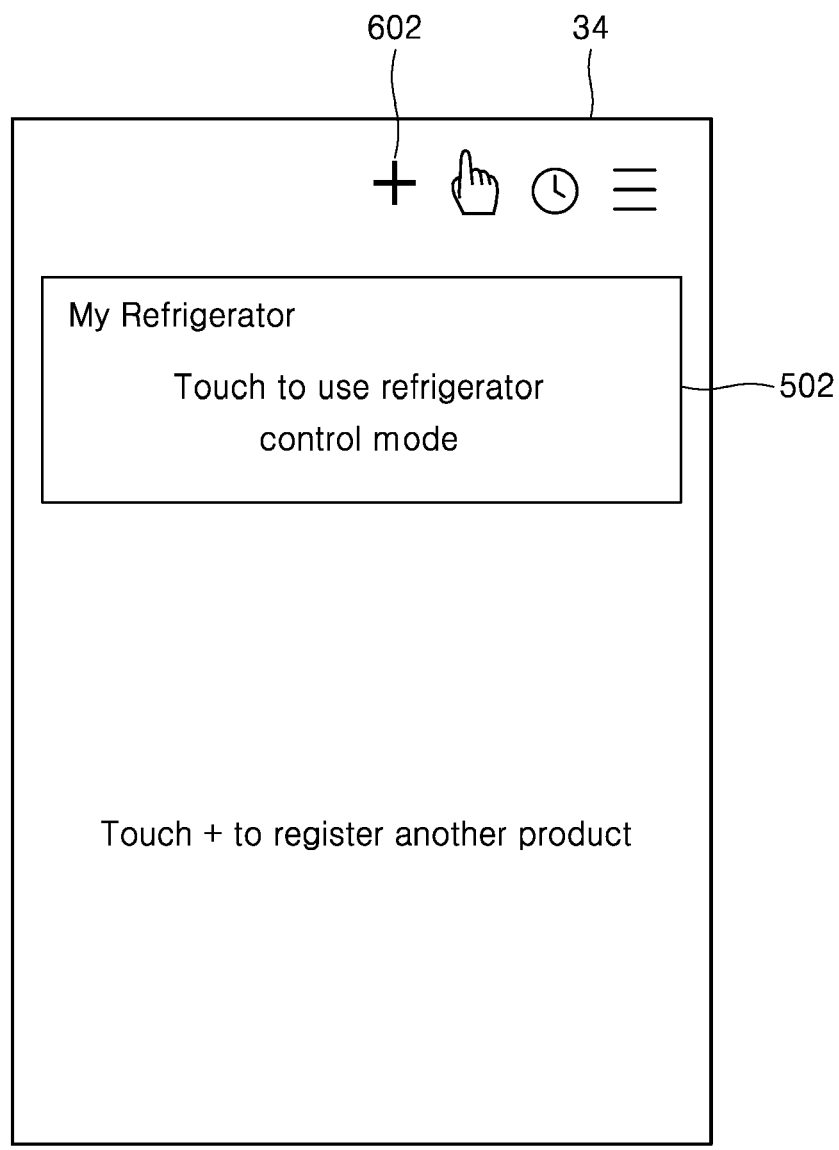

After the refrigerator 308 is registered, an initial screen 34 as in FIG. 16 may be displayed on the display 321.

In this case, a refrigerator control button 502 for control of the registered refrigerator 308 may be added on the initial screen 34. The user may press the refrigerator control button 502 on the initial screen 34 to control operation of the refrigerator 308, or to detect information (e.g., temperature information and the like) in relation to the operation of the refrigerator 308 in real time.

In the above-described method for registering an electronic device according to the present disclosure, the user does not need to detect features of each electronic device to register the electronic device and may detect a method for registering an electronic device accurately and rapidly based on an operation for outputting an identification sound.

Figure 17:
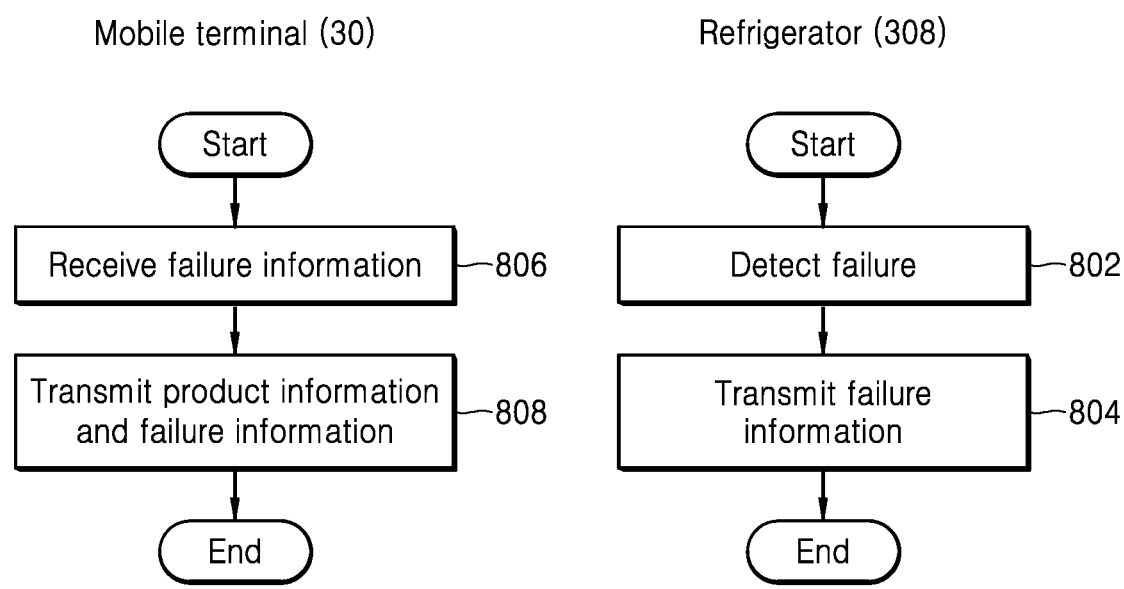
FIG. 17 is a flow chart showing a process of transmitting failure information after a mobile terminal registers an electronic device according to one embodiment.

FIG. 17 is a flow chart showing a process of transmitting failure information after a mobile terminal registers an electronic device according to one embodiment.

After an electronic device, e.g., the refrigerator 308 is registered in the above-described process, the user may request detection of a failure of the previously registered refrigerator 308 through an application for control of a smart home appliance.

When receiving a signal for requesting detection of a failure from the mobile terminal 30, the refrigerator 308 itself may perform failure analysis and detect any failure (802).

When broken parts or functions are detected through the detection of a failure, the refrigerator 308 may transmit failure information to the mobile terminal 30 (804). The failure information may include names of broken parts or functions. Additionally, the failure information may include failure codes corresponding to the broken parts or functions. The failure codes may be stored in the storage 332.

The mobile terminal 30 may receive the failure information from the refrigerator 308 (806), and may display results of the detection of a failure of the refrigerator 308 or the received failure information through the display 321. After detecting a failure of the refrigerator 308, the user may apply to a service center for a customer service using a function of applying for a customer service of an application installed on the mobile terminal 30.

When the user applies for a customer service, the controller 322 may transmit the failure information received from the refrigerator 308 together with the product information (e.g., a model name or a serial number) of the refrigerator 308, stored in the storage 324 in the above-described registration process, to the registration server 32 through the Communication device 325 (808).

When receiving the product information and the failure information from the mobile terminal 30, the registration server 32 may deliver the user's request for a customer service to a mobile terminal 34 of a customer service provider for a service center at a shortest distance from the user or a mobile terminal 34 of a customer service provider at a shortest distance from the user. The registration server 32 may transmit the product information and failure information previously received as well as the request for a customer service to the mobile terminal 34 of the customer service provider.

Accordingly, the user may apply for a customer service conveniently and rapidly without providing details about the product information or states of the broken product during the process of applying for a customer service.

Additionally, the customer service provider may quickly detect the model name, or the serial number of the broken product, and the broken parts or functions of the product, thereby making it possible to offer a customer service more rapidly. Further, the customer service provider may verify the product information and failure information of the broken product in advance, thereby making it possible to offer parts and customer services appropriate for the product.

The embodiments have been described with reference to a number of illustrative embodiments thereof. However, the present disclosure is not intended to limit the embodiments and drawings set forth herein, and numerous other modifications and embodiments can be devised without departing from the present disclosure.

The invention claimed is:

1. A method for registering an electronic device to be controlled by a mobile terminal, comprising:
   receiving a request to register an electronic device;
   providing, on a display of the mobile terminal, an operation interface that enables a user to provide user input that causes the electronic device to output an identification sound;
   receiving, from the electronic device, the identification sound output from the electronic device based on the user input;
   verifying product information of the electronic device corresponding to the identification sound;
   providing, on the display of the mobile terminal, a registration interface corresponding to the product information of the electronic device, the registration interface providing registration information related to how to register the electronic device to be controlled by the mobile terminal; and
   performing, by the mobile terminal, a registration process set forth by the registration information to register the electronic device to enable the mobile terminal to control the electronic device,
   wherein verifying the product information comprises:
      converting the identification sound into an identification pattern,
      searching a pre-stored classification table including one or more identification patterns and product information corresponding to each identification pattern, and
      determining product information of the electronic device based on the converted identification pattern being included in the pre-stored classification table.

2. The method of claim 1, further comprising searching a pre-stored registration table including the registration information corresponding to the product information of the electronic device.

3. The method of claim 1, wherein registering the electronic device comprises:
   receiving, from the electronic device, the registration information; and
   registering the electronic device with reference to the registration information to enable the mobile terminal to control the electronic device.

4. The method of claim 1, further comprising determining, based on product information of the electronic device not being verified, failure in registration of the electronic device.

5. The method of claim 1, further comprising determining, based on a registration interface corresponding to the product information of the electronic device indicating that registration is unavailable, failure in registration of the electronic device.

6. The method of claim 1, further comprising:
   receiving, from the electronic device, failure information after the electronic device is registered; and
   transmitting, to a computing device of a customer service provider through a registration server, product information and failure information of the electronic device.

7. A mobile terminal, configured to register an electronic device, comprising:
   a display configured to display an image or a text;
   a controller configured to provide, based on a request to register the electronic device being received on the display, an operation interface on the display, the operation interface enabling a user to provide user input that causes the electronic device to output an identification sound; and
   an identification sound receiver configured to receive, from the electronic device, the identification sound output based on the user input,
   wherein the controller is further configured to (i) verify product information of the electronic device corresponding to the identification sound, (ii) provide, on the display, a registration interface corresponding to the product information of the electronic device, the registration interface providing registration information related to how to register the electronic device to be controlled by the mobile terminal, and, (iii) perform a registration process set forth by the registration information to register the electronic device to enable the mobile terminal to control the electronic device, and
   wherein verifying the product information comprises:
      converting the identification sound into an identification pattern,
      searching a pre-stored classification table including one or more identification patterns and product information corresponding to each identification pattern, and
      determining product information of the electronic device based on the converted identification pattern being included in the pre-stored classification table.

8. The mobile terminal of claim 7, wherein the controller is further configured to search a pre-stored registration table including a registration method corresponding to the product information of the electronic device.

9. The mobile terminal of claim 7, wherein the controller is further configured to:
   register the electronic device with reference to registration information received from the electronic device to enable the mobile terminal to control the electronic device.

10. The mobile terminal of claim 7, wherein the controller is further configured to determine, based on product information of the electronic device not being verified, failure in registration of the electronic device.

11. The mobile terminal of claim 7, wherein the controller is further configured to determine, based a registration interface corresponding to the product information of the electronic device indicating that registration is unavailable, failure in registration of the electronic device.

12. The mobile terminal of claim 7, wherein the controller is further configured to:
   transmit, to a computing device of a customer service provider through a registration server, failure information received from the electronic device and product information of the electronic device after the electronic device is registered.

13. A system for registering an electronic device, comprising:
   a mobile terminal communicatively coupled to the electronic device through a communication device,
   wherein the mobile terminal includes:
      a display configured to display an image or a text;
      a controller configured to provide, based on a request to register the electronic device being received on the display, an operation interface on the display, the operation interface enabling a user to provide user input that causes the electronic device to output an identification sound; and
      an identification sound receiver configured to receive, from the electronic device, the identification sound output based on the user input,
   wherein the controller is further configured to (i) verify product information of the electronic device corresponding to the identification sound, (ii) provide, on the display, a registration interface corresponding to the product information of the electronic device, the registration interface providing registration information related to how to register the electronic device to be controlled by the mobile terminal, and, (iii) perform a registration process set forth by the registration information to register the electronic device to enable the mobile terminal to control the electronic device, and
   wherein verifying the product information comprises:
      converting the identification sound into an identification pattern,
      searching a pre-stored classification table including one or more identification patterns and product information corresponding to each identification pattern, and
      determining product information of the electronic device based on the converted identification pattern being included in the pre-stored classification table.

14. The system of claim 13, wherein the controller is further configured to search a pre-stored registration table including a registration method corresponding to an identifier of the electronic device.

15. The system of claim 13, wherein the controller is further configured to:
   register the electronic device with reference to registration information received from the electronic device to enable the mobile terminal to control the electronic device.

16. The system of claim 13, wherein the controller is further configured to determine, based on (i) product information of the electronic device not being verified or (ii) a registration interface corresponding to the product information of the electronic device indicating that registration is unavailable, failure in registration of the electronic device.

17. The system of claim 13, wherein the controller is further configured to:
   transmit, to a computing device of a customer service provider through a registration server, failure information received from the electronic device and product information of the electronic device after the electronic device is registered.

* * * * *